H. C. FRANDSEN.
PIVOT LIGHT FOR AUTOMOBILES.
APPLICATION FILED DEC. 5, 1910.

988,563.

Patented Apr. 4, 1911.

Witnesses,
Charles Pickles
R. S. Berry

Inventor:
Harry C. Frandsen.
By Geo. H. Strong
atty

UNITED STATES PATENT OFFICE.

HARRY C. FRANDSEN, OF CONCORD, CALIFORNIA.

PIVOT-LIGHT FOR AUTOMOBILES.

988,563. Specification of Letters Patent. Patented Apr. 4, 1911

Application filed December 5, 1910. Serial No. 595,582.

*To all whom it may concern:*

Be it known that I, HARRY C. FRANDSEN, citizen of the United States, residing at Concord, in the county of Contra Costa and State of California, have invented new and useful Improvements in Pivot-Lights for Automobiles, of which the following is a specification.

This invention relates to lamps for road vehicles, and pertains especially to a pivotally mounted light which will turn sidewise in unison with the steering wheels of the vehicle.

The object of the invention is to provide means whereby a pivotally mounted light will turn in unison with the front wheels of the vehicle so that the rays of the lamp will be cast always along the road directly in the line of travel and irrespective of the sinuosity of the path traversed by the vehicle.

A further object is to provide means by which the lamp can be uncoupled from the steering mechanism at any time and be held in fixed position.

The invention consists of the parts and construction and combination of parts as hereinafter more fully described and claimed, having reference to the accompanying drawings, in which—

Figure 1:
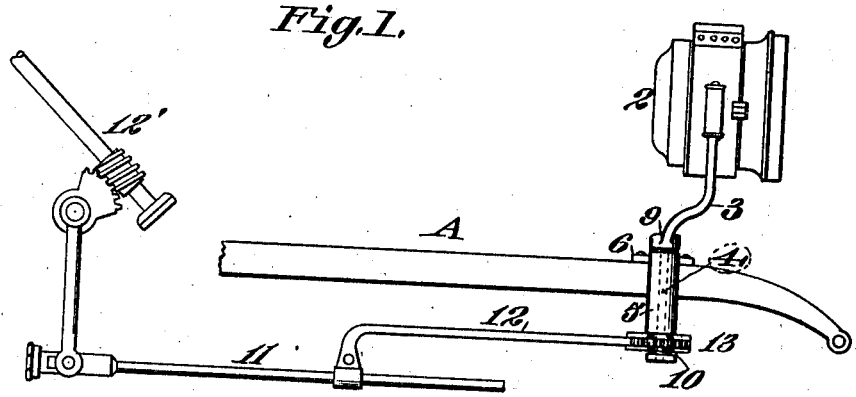
Figure 2:
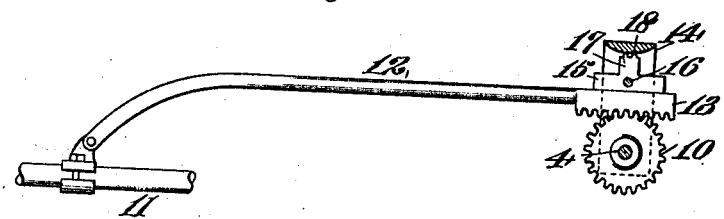
Figure 3:
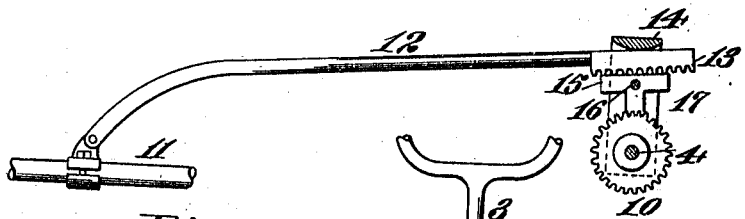
Figure 4:
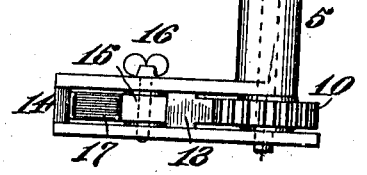

Figure 1 is a side elevation of a portion of a vehicle frame and steering mechanism showing the application of the invention. Fig. 2 is a plan view of the means for coupling the lamp to the steering mechanism. Fig. 3 is a view similar to Fig. 2, with the lamp in uncoupled, fixed position. Fig. 4 is a detail in partial section of the lamp bracket and its connections.

A represents any suitable part of a vehicle frame offering an appropriate support for the lamp 2. The lamp 2 is here shown as mounted on a bracket 3 which has a vertical stem 4 pivoting in a sleeve 5 which is suitably attached to the vehicle frame member A. This sleeve 5 is here shown as having a top lug 6 by which it can be bolted, as shown at 7, Fig. 4, to the part A. If desired, antifriction members 8 may be interposed between the top of the sleeve and a collar 9 on bracket 3 to reduce friction. The lower end of the stem 4 projects below the sleeve bearing 5 and carries a gear 10, which is operated through the following specially designed connections; either the steering knuckle connections or the tiller wheel of the vehicle.

11 represents the usual rod which runs from the steering mechanism represented at 12, to the steering knuckles (not shown) to guide the steering wheel of the vehicle. At some suitable point along the length of the rod 11, I connect my coupler rod 12, which latter has a rack 13 at its forward end adapted to be moved in and out of mesh with the gear 10, which latter is rigid with the lamp stem 4 and bracket 3. As shown in Fig. 4, the lower end of the sleeve bearing 5 has an offset slotted guide 14, which forms a slide-way for the rack 13 and a supporting guide for the gear 10. When it is desired to work the lamp in unison with the steering wheels or steering tiller the rack 13 is put in mesh with gear 10, as shown in Fig. 2, and a reversible bearing block 15, here shown as substantially T-shaped, is locked in position behind the flat back of the rack 13 by means of a bolt 16; the portion of the block 15 which bears against the flat back of the rack 13 being also smooth and flat and forming a guide and support to maintain the rack 13 and pinion 10 in mesh. This is the usual position of the parts when the lamp is lighted and it is desired to see the roadway directly in the path of travel of the vehicle.

In the day time if not desired or necessary to use the lamp, and in order to avoid wear on the parts, I have provided means by which the rack 13 can be quickly disconnected from the pinion 10, and the pinion 10 and lamp locked fixedly in straight-ahead position. To this end the bearing block 15 has a lateral projection 17 provided with one or more gear teeth 18, which when the parts are reversed, as shown in Fig. 3 will engage with the teeth of the pinion 10. With the parts in this position, shown in Fig. 3, the flat back of the bar 12 will bear against the rear wall of the guide 14 and the teeth of the rack 13 will slide free along the smooth back of the reversible bearing block 15; it being understood that the length of the projection 17 and the proportion of the other parts and position of the pivot 16, are all such as to permit of this desired reversal.

In practice, a lamp with this attachment can be applied to any vehicle already in use without any special appliances. To couple the lamp to the steering gear or steering wheels the parts are arranged as shown in Fig. 2. To disengage the lamp it is simply necessary to take out the bolt 16, remove block 15 from behind the rack 13, push the rack back against the rear wall of guide 14 and re-insert block 15 in reverse position, as shown in Fig. 3 and lock the same in place by the wing bolt 16.

One advantage of this construction is that it can be applied to any vehicle already in use; also that the long sleeve bearing 5 obviates vibration; and furthermore, the support for the lamp is stiffened by the angular brace flange 6, so that the part A is firmly locked in the angle formed by the vertical part of the sleeve bearing 5 and the flange 6. Another important feature is the rack and pinion connection, and the means for disengaging the lamp, as just described.

Having thus described my invention, what I claim and desire to secure by Letters Patent is—

1. The combination of a lamp bracket, having a vertical stem, a sleeve bearing of considerable length in which the stem turns, said sleeve bearing having an offset flange for attachment to a part of a vehicle frame, the stem carrying a pinion, a rack engageable with the pinion, and reversible means to hold the rack against the pinion capable of being inserted between the rack and pinion to lock the latter against turning without interfering with the reciprocating movement of the rack.

2. The combination with a vehicle frame of an automobile and the steering mechanism thereof, a lamp bracket turnable on a vertical pivot, rack and pinion connections between the lamp and the steering mechanism whereby the lamp will turn in unison with the turning movements of the vehicle, and means interposed between the rack and pinion to lock the latter in place without interfering with the sliding movement of the rack.

3. The combination of a lamp bracket turnable in suitable bearings from side to side, a vertical stem for the bracket, a pinion on the stem, a sliding rack to mesh with the pinion, a slotted guide for the rack and pinion, and a reversible bearing block insertible alternately behind the rack to hold it in mesh with the pinion and in front of the rack to hold it out of mesh therewith, and means for holding the block in reversed position.

In testimony whereof I have hereunto set my hand in the presence of two subscribing witnesses.

HARRY C. FRANDSEN.

Witnesses:
CHARLES EDELMAN,
D. B. VALENTINE.

---

Copies of this patent may be obtained for five cents each, by addressing the "Commissioner of Patents, Washington, D. C."